July 29, 1969 D. R. GITTINGS 3,458,123

DATA PROCESSING APPARATUS

Filed June 13, 1966 5 Sheets-Sheet 1

INVENTOR.
Donald R. Gittings

BY Hill, Sherman, Meroni, Gross & Simpson ATTORNEYS

DATA PROCESSING APPARATUS

Filed June 13, 1966 5 Sheets-Sheet 2

INVENTOR.
Donald R. Gittings

BY Hill, Sherman, Meroni, Gross & Simpson ATTORNEYS

July 29, 1969 D. R. GITTINGS 3,458,123

DATA PROCESSING APPARATUS

Filed June 13, 1966 5 Sheets-Sheet 3

INVENTOR.
Donald R. Gittings

Hill, Sherman, Meroni, Gross & Simpson ATTORNEYS

DATA PROCESSING APPARATUS

Filed June 13, 1966 5 Sheets-Sheet 4

INVENTOR.
Donald R. Gittings

BY Hill, Sherman, Meroni, Gross & Simpson ATTORNEYS

INVENTOR.
Donald R. Gittings

BY Hill, Sherman, Meroni, Gross & Simpson
ATTORNEYS

United States Patent Office 3,458,123
Patented July 29, 1969

3,458,123
DATA PROCESSING APPARATUS
Donald R. Gittings, Flossmoor, Ill., assignor, by mesne assignments, to International Datacon Inc., a corporation of Illinois
Filed June 13, 1966, Ser. No. 557,021
Int. Cl. G06k *1/04, 1/14*
U.S. Cl. 234—32 8 Claims

ABSTRACT OF THE DISCLOSURE

An adapter assembly has universal bracket means for attachment to any of a plurality of different makes of electric typewriters, multiple switch means having a series of individually operable sets of contacts with a flexible coupling means enabling actuation of a different set of contacts in response to manual actuation of each key of the typewriter, and a coding means for transmitting predetermined code patterns in response to actuation of the respective sets of contacts. Also shown is a program board in association with the coding means which enables adapting different units of the same overall design to transmit different codes and/or permits the conversion of a given unit to a different code, and a remotely operated card punch for punching standard computer cards in response to operation of a conventional business machine such as an electric typewriter.

Description of the invention

The present applicant has discovered that there is an urgent need for equipment which will enable the encoding of data without requiring the purchase of complete specialized and relatively expensive systems. The concept of the present invention enables the use of existing business equipment to generate and/or record digital signals. In certain fields, applicant's equipment has enabled the data collection process to be carried out simultaneously with the generation of the source data, thus eliminating the need for separate keypunching and verification, these operations being generally the most expensive element of a data collection system.

It is therefore an object of the present invention to provide a data processing system adaptable to substantially any make of business machine so as to enable generation and/or recording of digital code signals representing the sequence of operation of the machine.

It is a further object of the present invention to provide such a data processing system which is readily adjusted to transmit source data in any of a plurality of different codes.

Another object of the invention is to provide a data processing system for offices and the like enabling disconnection and separate use of individual portable items of the system.

Still another object of the invention is to provide a data processing system for recording digital data, for example on standard computer punch cards, simultaneously with the generation of the source data.

Another and further object of the invention is to provide an encoder adaptor assembly for attachment to any make of electric typewriter so as to enable generation and/or recording of digital signals in accordance with the sequence of operation of such typewriter.

Still another object of the invention is to provide rugged and reliable adaptor equipment for converting existing office equipment to use in a data processing system.

A still further object of the invention is to provide adaptor equipment so designed as to facilitate assembly thereof with existing standard office machines.

Still another and further object of the invention is to provide a novel card punch device suitable for reliable actuation by electric signals from a remote station.

Figures 1, 5, 7, 7A:
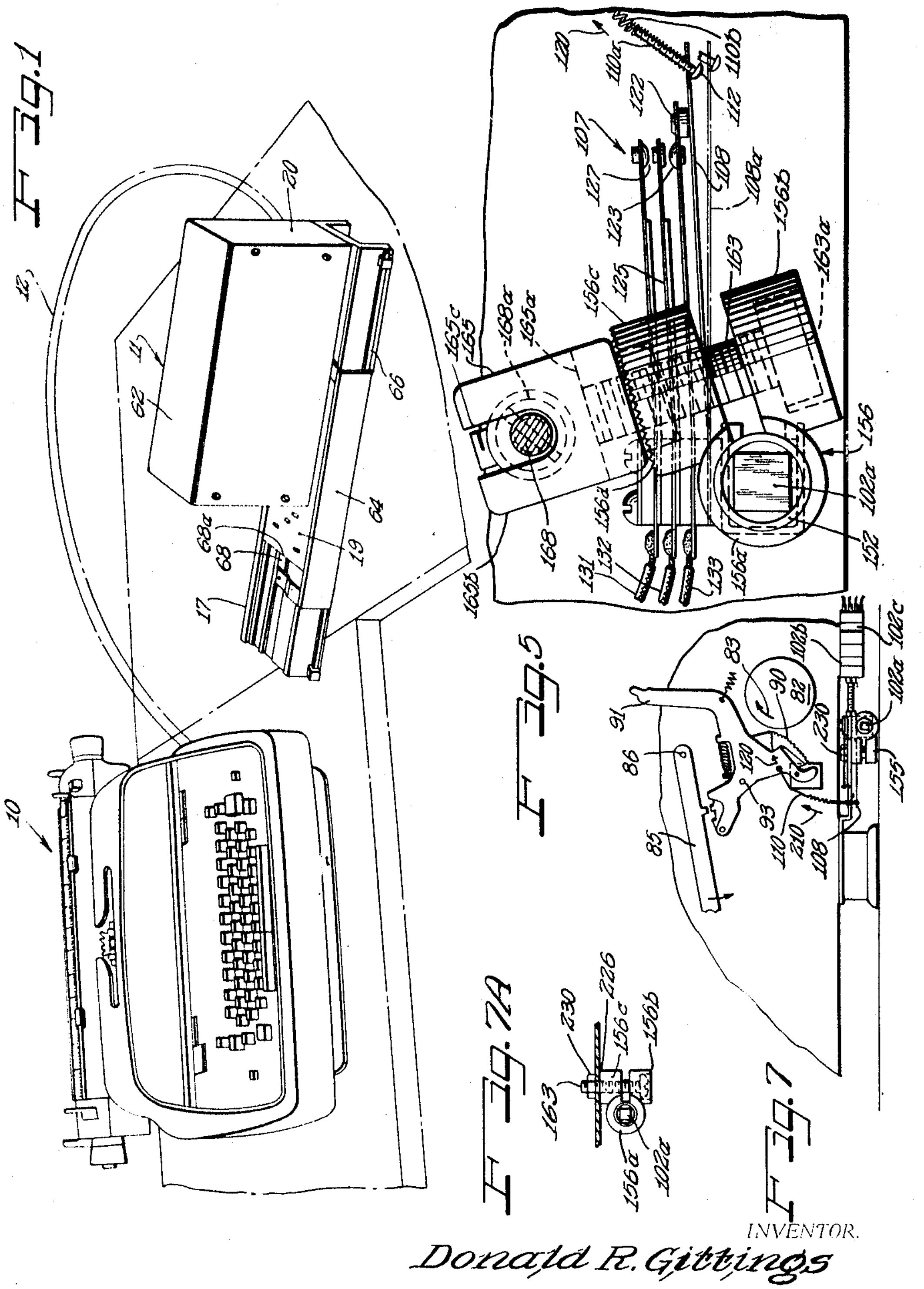
Figure 2:
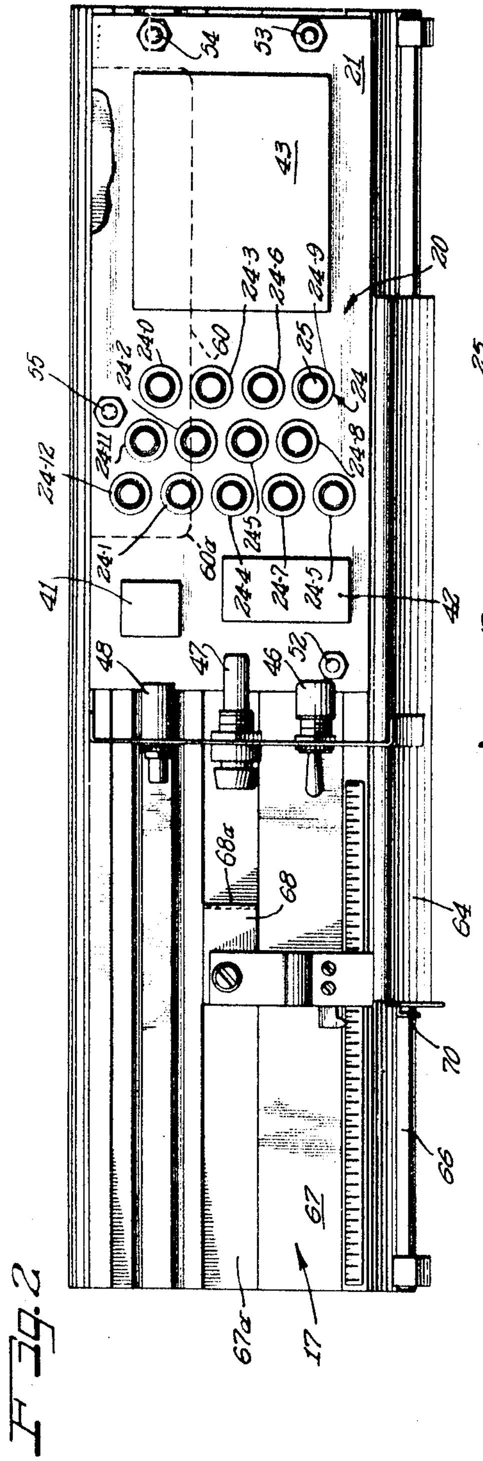
Figure 3:
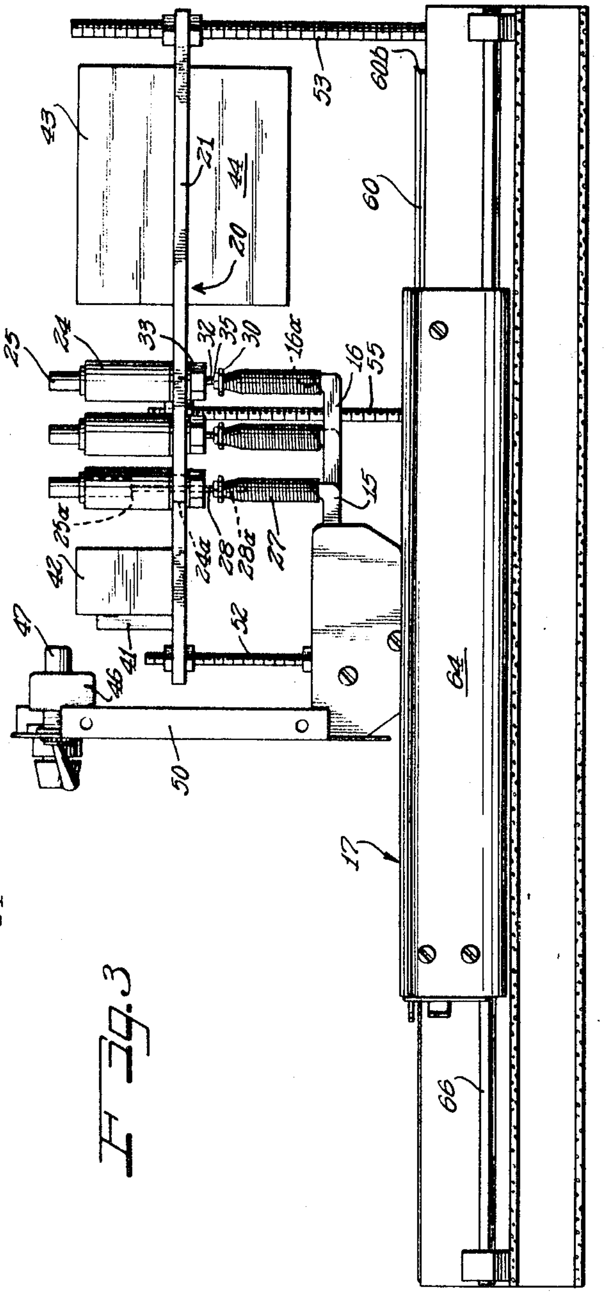
Figure 4:
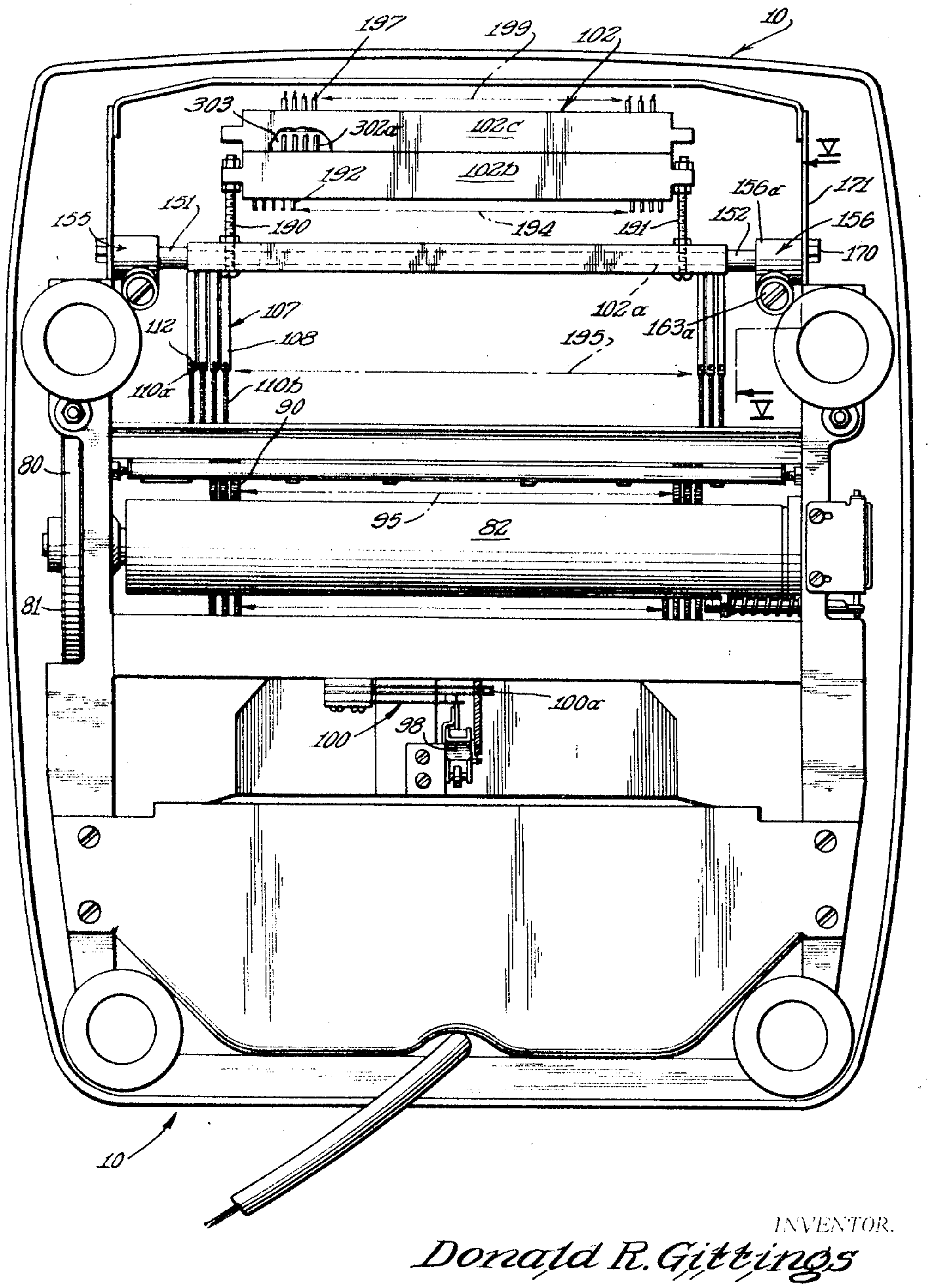
Figure 6:
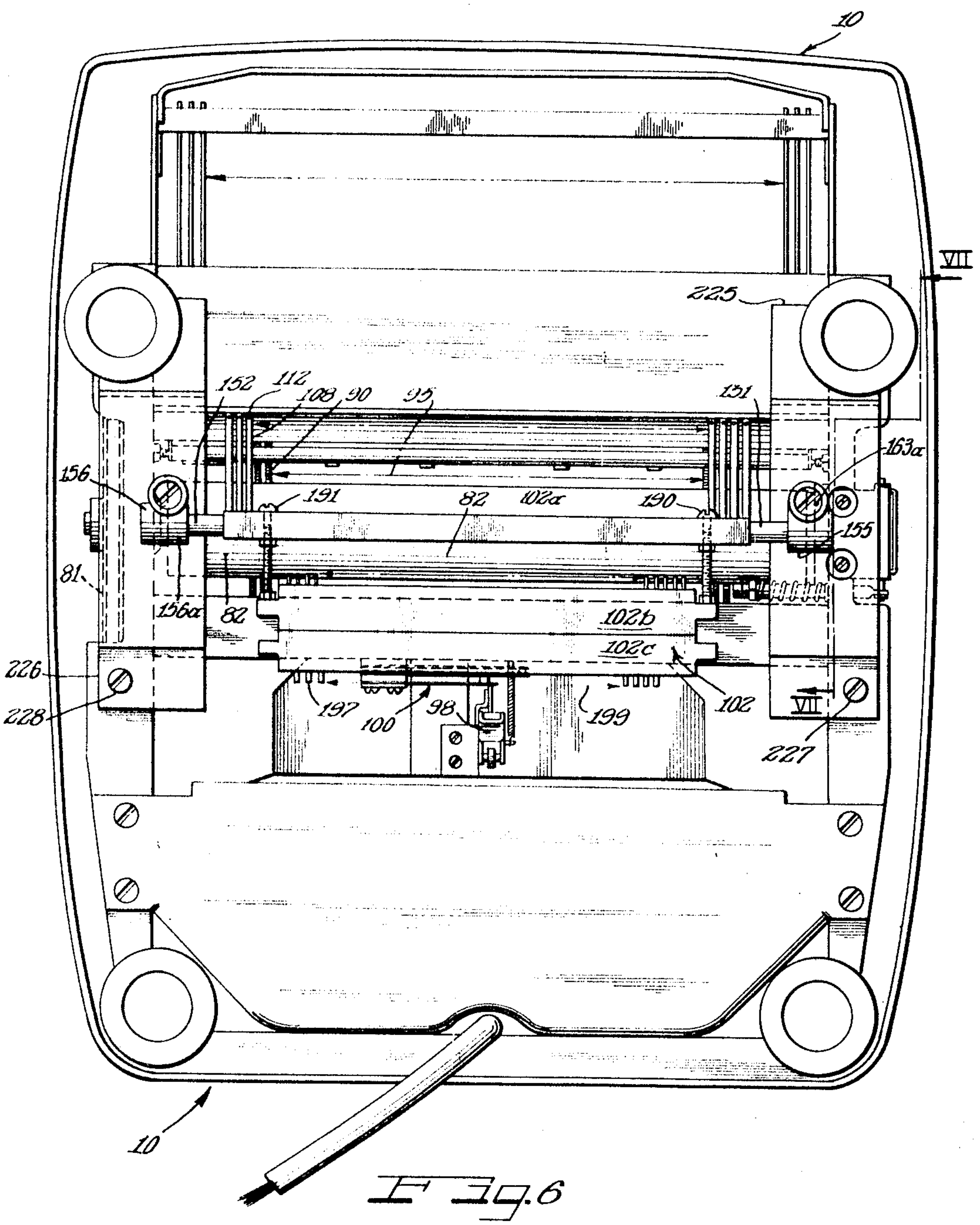
Figures 8, 9:
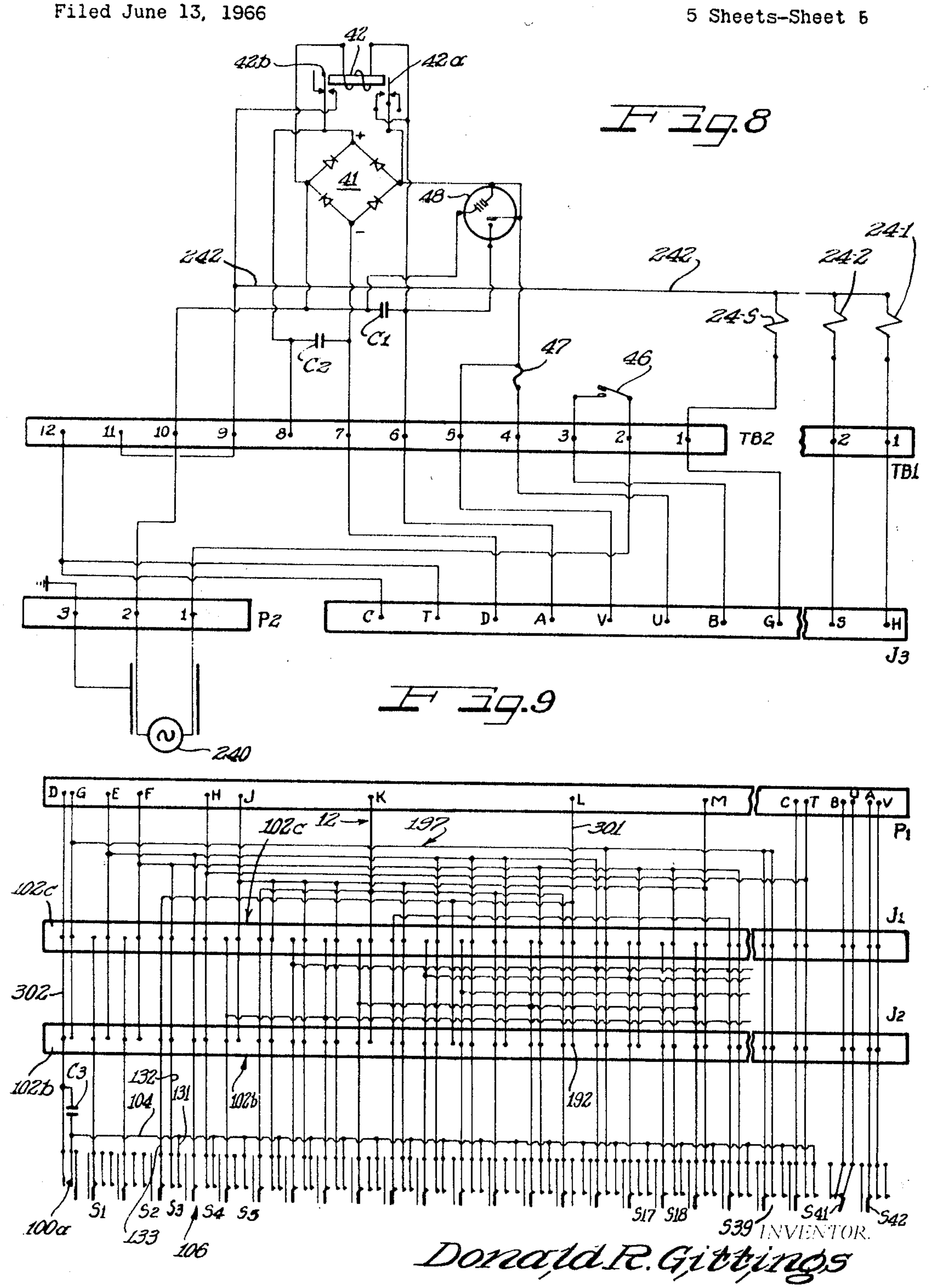

Other objects, features and advantages of the present invention will be apparent from the following detailed description of the invention taken in connection with the accompanying drawings, in which:

FIG. 1 is a somewhat diagrammatic perspective view of a data processing system in accordance with the present invention;

FIG. 2 on sheet 2 of the drawings is a somewhat diagrammatic plan view of the card punch device of FIG. 1 with a cover plate removed to show the arrangement of certain interior parts;

FIG. 3 is a somewhat diagrammatic side elevational view of the device of FIG. 2;

FIG. 4 on sheet 3 of the drawings is a somewhat diagrammatic bottom plan view of the electric typewriter of FIG. 1 having an encoder adaptor assembly in accordance with the present invention applied thereto;

FIG. 5 on sheet 1 of the drawings is a somewhat diagrammatic enlarged vertical sectional view taken generally along the line V—V of FIG. 4 and showing certain parts of the adaptor assembly in an upright orientation;

FIG. 6 on sheet 4 of the drawings is a somewhat diagrammatic bottom plan view similar to FIG. 4 but showing an approved arrangement of parts in accordance with the present invention;

FIG. 7 on sheet 1 of the drawings is a somewhat diagrammatic vertical sectional view taken generally along the line VII—VII of FIG. 6 and showing the parts in an upright orientation;

FIG. 7A on sheet 1 of the drawings is an enlarged view showing certain parts of FIG. 7 in greater detail;

FIG. 8 on sheet 5 of the drawings illustrates a portion of the electric circuit for the system of FIG. 1; and FIG. 9 illustrates another portion of the electric circuit for the system of FIG. 1.

In FIG. 1, the reference numeral 10 indicates a standard electric typewriter and the reference numeral 11 illustrates a commercially available card punch device which has been modified to carry out the concepts of the present invention. An electric cable is indicated at 12 for conveying digitally coded signals from an encoder adaptor assembly applied to the typewriter 10. By way of example, these digitally coded signals are utilized by the conversion device 11 to create a digital record of the successive operations of the typewriter 10.

Referring to FIG. 3 the lever arms such as indicated at 15 and 16 are a part of a commercially available manually operated card punch which need not be described in detail and which is generally designated by the reference numeral 17. The standard device 17 may, for example, be provided with a series of thirteen levers such as indicated at 15 and 16 which levers normally operate to actuate respective punch elements in accordance with a standard code. For example, ten of the levers may be associated with individual single punch elements corresponding to the numbers 0–9 and adapted to place rectangular apertures in a card 19, FIG. 1, at successive locations across the width of the card. Two further levers in the commercial device are operated by push buttons designated "11" and "12" which actuate punch elements in two further spaces relative to the width of the card. As is well known in the art, these last-mentioned punches are utilized in conjunction with the 0–9 punches to code letters of the alphabet. A further lever serves to space the card in the longitudinal direction and has a push button designated by the letter "S" in the commercial device.

In the illustrated equipment, an adaptor means 20 has been applied to the commercial device 17 so as to enable remote actuation of the card punching means. Such adaptor comprises a mounting plate 21 carrying a series of 13 solenoids 24 each having an armature such as indicated at 25 aligned with the free end of one of the levers such as 16. In one embodiment of the adaptor assembly a series of plastic rods were affixed to the lower ends of the respective armatures 25, and the lower ends of the plastic rods abutted the respective pushbuttons associated with levers such as 16 in the original equipment. In this case, there was virtually no alteration of the commercial device except for the super-positioning of the adaptor assembly 20 thereon.

In accordance with an improved version, however, the pushbuttons are removed from the free ends of the lever arms such as 16, for example by cutting the material of the lever arms along a sloping line such as indicated at 16a in FIG. 3. In this illustrated arrangement, a helical coil spring such as indicated at 27 is connected to the lower end of each armature 25, for example by means including a machine screw such as indicated at 28 engaged in a threaded aperture at the lower end of each of the armatures 25. Simply by way of example, machine screws 28 may be of a length to have a lower end portion as indicated at 28a extending within a tapering upper end portion of the associated helical coil spring 27. A brass ferrule 30 is threaded onto each screw 28 to engage and position the associated coil spring 27. A suitable sealant may be employed to lock the ferrule in position on the screw once final adjustment has been achieved. An O ring 32 of resilient material is interposed between each ferrule and the adjacent solenoid securing nut 33. As indicated at 24a the solenoids may be provided with reduced diameter extensions projecting through receiving apertures in the plate 21 and these extensions may be threaded to receive the nuts 33. The extensions are, of course provided with a central bore to enable and guide the reciprocation of the screw member 28. The lower end of an armature 25 is indicated at 25a in FIG. 3. The upper end of the screw member 28 may be threadedly engaged into the lower end of the armature 25 as previously mentioned. By way of example the drive springs 27 may be formed from .024 inch music wire with 8 turns having a relatively constant inside diameter of .165 inch, with 10 turns of progressively increasing diameter and with 28 further turns of a constant inside diameter of .195 inch. As indicated in FIG. 3, ferrules 30 may be secured in the desired adjusted positions by means of lock nuts as indicated at 35 with shakeproof washers between the lock nuts and ferrules.

Referring to FIG. 2 a rectifier may be located at 41, a relay at 42 and a .33 microfarad capacitor at 43. Referring to FIG. 3, a 200 microfarad electrolytic capacitor may be located at 44 at the underside of the mounting plate 21. A toggle switch is indicated at 46, a fuse holder at 47 and an illuminated pushbutton switch at 48 on a panel 50 which cooperates with a cover plate for these parts, not shown.

It will be noted that the studs 52–55 provide for the vertical adjustment of the mounting plate 21 so as to properly adjust the height of the solenoids 24 relative to the actuating arms such as 15 and 16.

A plastic guide plate is preferably added to the commercial device 17 as indicated at 60 in FIGS. 2 and 3. The corner 60a of the card guide 60 preferably has a rounded corner with a .063 inch radius at its upper face. The lower face of the corner is preferably rounded as indicated at 60b in FIG. 3 with a radius of .063 centered at the upper face of the guide. The curvature 60b is also applied at the edge 60a of the guide 60.

FIG. 1 illustrates cover plate 62 for the adaptor parts of the punch device. FIG. 1 also shows the location of a card 19 in relation to an indexing slide 64 of the conventional card punch device 17. Each time one or more of the levers such as indicated at 15 and 16 in FIG. 3 is actuated, the indexing tray 64 is shifted longitudinally by a predetermined distance. By way of example, the card 19 may have a total of 80 possible columns along its length in which case the indexing slide 64 has a range of travel which is completed in 80 successive individual steps. The direction of indexing trvel may be from right to left as viewed in FIGS. 1–3. A new card may be located in relation to the slide 64 while the slide is at the extreme left, after which the slide is moved to the extreme right tensioning a suitable indexing spring and preparing the slide for its indexing travel. Generally the commercial device includes a nylon pulley with a helical groove on its surface and which is spring urged to wind a cord into the helical groove, the free end of the cord being secured to the slide 64 so as to urge the slide in the indexing direction, that is from right to left as viewed in FIGS. 1–3. Preferably the commercial device is modified so as to utilize a constant tension spring in conjunction with the pulley for more reliable operation. A rack may be secured to the slide 64 and actuation of any of the levers 15 and 16 may serve to index a ratchet assembly associated with the rack as well as operating the associated punch. The slide 64 may carry flanged nylon rollers riding on the track 66 to provide relatively low friction. As seen in FIG. 2, the card supporting table 67 may include a guideway 67a for a nylon block 68 which serves as a further guide for the slide assembly 64. A similar block may be provided at the opposite end of the slide 64, and the confronting edges such as 68a of these blocks may engage and overhang opposite ends of a card being fed by the slide. An operating finger is provided as indicated at 70 for releasing the ratcheting mechanism in order to move the slide to the left independently of operation of the actuating arms such as 15 and 16.

FIG. 4 is a bottom plan view of the typewriter 10. Indicated diagrammatically is a drive belt 80 for driving a pulley 81 which is connected with a power roller 82. Conventionally the power roller 82 is driven continuously while the typewriter is in operation. The direction of rotation of the roller 82 is indicated by the arrow 83 in FIG. 7. FIG. 7 also illustrates the conventional type bar key lever 85 which is pivotal at 86 and is rocked in the counterclockwise direction in response to manual pressure on a given key of the typewriter. Such manual pressure serves to engage 90 with the friction surface of the power roller 82 whereupon the cam lever indicated at 91 is actuated in the counterclockwise direction about its pivot point indicated at 93. A few of the cams 90 have been physically indicated in FIG. 4 while the dot dash line 95 is intended to indicate the general location of the remaining cams of the series. Further cooperating parts of a typical electrical typewriter are illustrated in U.S. Patent 2,506,444 issued May 2, 1950, and a better understanding of the operation of the conventional parts illustrated in FIG. 7 may be had by reference to said patent.

The conventional typewriter further includes a part 98 which is actuated each time a key is depressed and each time the spacer bar is depressed, and a master switch 100 is provided so arranged as to be momentarily closed each time the mechanism 98 of the conventional typewriter is actuated. The master switch 100 is provided for the purpose of opening and closing the circuit to an encoder assembly 102 which is applied to the typewriter in accordance with the teachings of the present invention. Referring to FIGS. 8 and 9, contacts 100a of the master switch 100 are indicated at the lower left of FIG. 9 and these contacts when momentarily closed apply a ground to the common line 104 of FIG. 9. The series of normally open contacts such as indicated at 106 are associated with respective character keys of the typewriter and are actuated to closed condition in response to actuation of the respective keys. After contacts such as 106 have closed, the contacts 100*a* of the master switch momentarily close to transmit a pulse over one or more lines in accordance with the character which has been operated. The master switch 100 serves to prevent arcing at the character representing contacts such as 106 and times the transmitted pulse so as to properly and reliably actuate selected ones of the solenoids 24. The encoder assembly 102 includes a series of individual switch elements such as indicated at 107 having the sets of contacts such as indicated at 106 associated therewith. Each switch element 107 includes a spring arm 108 with an aperture at the free end thereof which enables coupling of the switch element to one of the cam levers 91 as indicated in FIG. 7. The coupling means comprises a wire 110 having one portion thereof formed into a helical coil spring of inner diameter and of pitch to securely receive a machine screw 112, FIG. 5 which is inserted through the aperture of the spring arm 108. Since the screw 112 is threadedly engaged with the wire 110 at its helical spring portion 110*a*, a very convenient and flexible means of coupling is provided between the typewriter and the encoder assembly 102. After the spring arms 108 have been coupled with the wires 110, the spring arms may be bent downwardly so as to assume a position as indicated at 108*a*, placing the helical spring elements 110*a* under tension at the region such as indicated at 110*b* thereof. When a given character key is operated, the associated cam lever 91 exerts a force on the wire 110 which is generally in the direction 120 as indicated in FIG. 5. With reference to the embodiment of FIG. 5 it will be observed that the direction 120 includes a component in the upward direction which will serve to close the contacts of the switch element 107. More specifically, contact arm 108 will engage a button 122 serving to close the contacts indicated at 123, and further upward movement of the spring arm 108 will move the contact arm 125 upwardly to close the contacts indicated at 127. Referring to the leads indicated at 131–133 in FIG. 5, during actuation of the switch element 107, leads 132 and 133 will first be connected together, after which both leads will be connected with leads 131. Referring to FIG. 9 where the corresponding reference numerals have been applied, it will be observed that the lead 131 is shown connected to the lead 104 which in turn is connected to one terminal of a D.C. source through the master switch contacts 100*a*.

Referring to the embodiment of FIGS. 4 and 5, the encoder assembly 102 includes a switch contact mounting bar 102*a* of square cross section with cylindrical sleeves 151 and 152 securely fixed at the opposite ends thereof and in telescoping relation thereto. Universal mounting means for the adaptor assembly 102 comprises a pair of brackets 155 and 156 having C-shaped clamping parts such as indicated at 156*a* fitting over the respective sleeves such as 152. Integral with the C-shaped part 156*a* is a pair of legs 156*b* and 156*c* having aligned apertures receiving a clamping screw 163. The screw 163 threads into a bracket part 165 of generally L shape and including a leg 165*a* with a threaded aperture for the screw 163 and including a leg 165*b* with a central slot as indicated at 165*c*. A machine screw 168 with a slotted head 168*a* is shown cooperating with the slot 165*c* for the purpose of mounting the bracket part 165 to a suitable portion of the frame of the typewriter or other business machine. The threaded end of the screw 168 receives a nut 170 for securing the bracket assembly 156 to a frame part such as indicated at 171 of the typewriter. As indicated in FIG. 5, the leg 156*c* may be provided with a series of teeth 156*d* for locking the L bracket part 165 in any desired angular position relative to the remainder of the adaptor assembly. Further, the clamp bracket part 156 is angularly adjustable about the axis of the bar 102*a* as will be apparent from FIG. 5, tightening of the screw 163, for example by means of the slotted head 163*a* serving to clamp all of the parts into a fixed relationship.

Referring to FIG. 4, the encoder assembly 102 further comprises program board parts 102*b* and 102*c* which provide the physical support for the remaining electrical circuitry represented diagrammatically in FIG. 9. The program board parts 102*b* and 102*c* are physically supported from the encoder bar 102*a* by means of screws 190 and 191 for ease of assembly and disassembly. The electrical conductors such as indicated at 131–133 in FIG. 5 extend to terminals such as indicated at 192 of the program board 102*b*. The dot dash line 194 indicates the series of omitted terminals 192 while the dot dash line 195 indicates the series of switch elements 107 which have not been specifically shown in FIG. 4. The program board 102*c* may have two series of plug receptacles for receiving patch cords such as indicated at 197 for interconnecting any desired pair of receptacles. The patch cords 197 are readily disengaged from the receptacles and may be utilized to adapt the encoder assembly to any desired digital code. The dot dash line 199 indicates additional patch cords, each end of each patch cord being plugged into a respective receptacle of the program board 102*c*.

The embodiment of FIGS. 6 and 7 represents a significant improvement over the embodiment of FIGS. 4 and 5 particularly in providing for the application of a substantially normal force on the spring arms 108 so that the actuating movement of the cam lever 91 produces a greater movement of the spring arm 108 in FIG. 7 than is the case with the arrangement of FIGS. 4 and 5. Thus, while the direction of the force applied to the spring arm 108 in FIG. 5 is generally in the direction of arrow 120, in FIG. 7, the force applied to the spring arm 108 is in a generally vertical direction as indicated by the arrow 210. Thus, the embodiment of FIG. 7 ensures a more reliable operation of the respective switch elements 107. The encoder assembly itself is the same in FIGS. 4 and 5, and 6 and 7, and the same reference numerals have been applied. In FIG. 4, the spring arms such as 108 extend toward the rear of the typewriter, while in FIG. 6, the spring arms 108 extend toward the front end or the keyboard end of the typewriter. In FIG. 6, suitable plates 225 and 226 have been secured to the typewriter frame by means of screws such as indicated at 227 and 228 and the universal bracket means 155 and 156 have in turn been secured to the plates 225 and 226. As seen in FIG. 7, the L bracket part 165 may be omitted with the arrangement of FIG. 7 and a nut such as indicated at 230 threaded onto the end of the clamping screw such as indicated at 163. The parts 156*a*, 156*b* and 156*c* of FIG. 7A correspond to the parts 156*a*, 156*b*, and 156*c*, respectively as described with reference to FIG. 5.

The electric circuit for the embodiments of FIGS. 4 and 5, and 6 and 7 are identical and will now be described in detail having reference to FIGS. 8 and 9.

Referring to FIG. 8, the components whose location is diagrammatically indicated in FIGS. 2 and 3 are shown by their electrical symbols and have been given the same respective reference numerals.

Referring to FIG. 8, the reference numeral 240 represents a suitable commercial power source supplying suitable alternating current potential between terminals 1 and 2 of the terminal strip P2, and the ground lug on the power cord being connected to terminal 3 of the terminal strip P2 which in turn is connected to the frame of the typewriter. Referring to the lower right in FIG. 9, switch element S41 is coupled with a suitable manually operated control on the typewriter which may be designated the "off" control. If the toggle switch 46 is closed, power is supplied from terminal 1 of terminal strip P2 through the toggle switch to terminal B of the jack J3. When plug P1 is coupled to jack J3, terminal B of plug P1 is connected with terminal B of jack J3 so that the circuit extends through the closed contacts of switch S41 to terminal U of plug P1 and then to terminal U of jack J3 which in turn leads to the fuse 47. If the push switch 48 is actuated the circuit continues through the relay 42 and back to terminal 2 of the terminal strip or plug P2. With relay 42 energized the circuit is also completed from the fuse 47 through the contact 42*a* to the relay to provide a holding circuit, and a circuit is provided from the positive terminal of rectifier 41 to conductor 242 which is common to all of the solenoids including the solenoids 24–S, 24–2 and 24–1 specifically indicated in FIG. 8. The circuit is now conditioned for transmitting data to the card punch simultaneously with the operation of the typewriter. When the operator desires to discontinue data transmission, the "off" switch element S41 is actuated to open the circuit and interrupt the holding circuit for the relay 42, allowing the relay to become deenergized and thus disabling the solenoids generally designated by the reference numeral 24.

Instead of operating the push button switch 48, the operator may actuate switch element S42 which may simultaneously allow the switch element 41 to return to its normal position with its contacts closed. The circuit is then completed from terminal 1 of plug P2 through toggle switch 46, terminal B, switch element S41, terminal U, fuse 47, terminal No. 5 of terminal strips TB2, terminal V of jack J3, terminal V of plug P1, through the contacts of switch element S42 to terminal A of plug P1, terminal A of jack J3 and then through the actuating coil of relay 42 to terminal 2 of plug P2, energizing the relay and enabling operation of the data processing circuitry as before.

It may be explained that the terminal strips TB1 and TB2 may each have 12 positions and may be located on the mounting plate 21 within the cover 62, FIG. 1. The terminal strips TB1 and TB2 and capacitor C1 may all be located in the area or region designated 43 in FIGS. 2 and 3. The capacitor C1 may have a value of .33 microfarad, the capacitor C2 may have a value of 200 microfarads, and the capacitor C3 associated with switch contacts 100*a* in FIG. 9 may have a value of .1 microfarad and a rating of 600 volts direct current. To illustrate a coding arrangement, the switch element S3 may correspond to the character Q. It may be desired to punch a hole in zone 11 and in numeric position 8 of the card 19, FIG. 1, to represent the letter Q. In this case the wiring at jacks J1 and J2 would be such that solenoids 24–11 and 24–8, FIG. 2, would be simultaneously energized. The solenoids 24–3 through 24–0 and 24–11 and 24–12 would be connected with terminal points 3 through 12 of terminal strip TB1 and would be connected to terminals R, Q, P, N, M, L, K, J, F and E of jack J3, respectively.

Thus with the switch element S3 actuated, the momentary actuation of contacts 100*a* would momentarily complete a circuit from the negative terminal of rectifier 41 through terminal 7 of terminal strips TB2 to terminal D of jack J3 and then to terminal D at the left of plug P1 as illustrated in FIG. 9. The circuit would then extend through contacts 100*a* to conductor 104 and then through conductor 131 to conductor 132 leading to terminal F of plug P1. As previously expained this terminal would be connected to terminal F of jack J3 which would be connected to one terminal of solenoid 24–11, the opposite terminal of the solenoid 24–11 being connected via conductor 242 and contact 42*b* of relay 42 to the positive terminal of the rectifier 41. Simultaneously a circuit would be completed from conductor 104 to conductor 133 and then to terminal L of plug P1, terminal L of jack J3 leading to one terminal of solenoid 24–8, the other terminal being connected to the common conductor 242. Also at this time the spacer solenoid 24S would be energized unless as is preferred the card punch 11 is designed to index the card whenever any one of the actuating levers such as 15 or 16, FIG. 3, is actuated.

In the illustrated circuit, the switch element S39 is coupled with the solenoid 24–S so that the solenoid 24–S is energized each time the spacer bar of the typewriter is actuated, for example.

It will be understood that the jacks J1 and J2 in FIG. 9 are embodied by the program boards 102*c* and 102*b*, respectively, of FIGS. 4 and 6. The cable indicated at 12 in FIG. 1 would include the detachable coupling between plug P1 and jack J3. The terminal lugs 192 of program board 102*b* would be arranged in two rows along the jack J2. Similarly the receptacles receiving the patch cords such as indicated at 197 in FIG. 4 would be arranged in two rows. These connectors are commercially available and well known in the art per se.

Having reference to the foregoing description, the following tabulation of the interconnections between the switch elements, the terminals of plug P1 and jack J3 and the solenoids will illustrate one typical code.

| | | Tabulation of solenoid connections via P1 and J3 from the contacts of the switch elements | | |
|---|---|---|---|---|
| Switch element | Character represented | Switch contact | Via terminal | To solenoid |
| S3 | Q | [1] S3–2 | F | 24–11 |
| | | [2] S3–3 | L | 24–8 |
| S4 | A | S4–2 | H | 24–1 |
| | | S4–3 | E | 24–12 |
| S5 | 2 | S5–3 | S | 24–2 |
| S6 | Z | S6–2 | J | 24–0 |
| | | S6–3 | K | 24–9 |
| S7 | W | S7–2 | J | 24–0 |
| | | S7–3 | N | 24–6 |
| S8 | S | S8–2 | J | 24–0 |
| | | S8–3 | S | 24–2 |
| S9 | 3 | S9–3 | R | 24–3 |
| S10 | X | S10–2 | J | 24–0 |
| | | S10–3 | M | 24–7 |
| S11 | E | S11–2 | E | 24–12 |
| | | S11–3 | P | 24–5 |
| S12 | B | S12–2 | E | 24–12 |
| | | S12–3 | Q | 24–4 |
| S13 | 4 | S13–3 | Q | 24–4 |
| S14 | C | S14–2 | E | 24–12 |
| | | S14–3 | R | 24–3 |
| S15 | R | S15–2 | F | 24–11 |
| | | S15–3 | K | 24–9 |
| S16 | F | S16–2 | E | 24–12 |
| | | S16–3 | N | 24–6 |
| S17 | 5 | S17–3 | P | 24–5 |
| S18 | V | S18–2 | J | 24–0 |
| | | S18–3 | P | 24–5 |
| S19 | T | S19–2 | J | 24–0 |
| | | S19–3 | R | 24–3 |
| S20 | G | S20–2 | E | 24–12 |
| | | S20–3 | M | 24–7 |
| S21 | 6 | S21–3 | N | 24–6 |
| S22 | B | S22–2 | E | 24–12 |
| | | S22–3 | S | 24–2 |
| S23 | Y | S23–2 | J | 24–0 |
| | | S23–3 | L | 24–8 |
| S24 | H | S24–2 | E | 24–12 |
| | | S24–3 | L | 24–8 |
| S25 | 7 | S25–3 | M | 24–7 |
| S26 | N | S26–2 | F | 24–11 |
| | | S26–3 | P | 24–5 |
| S27 | U | S27–2 | J | 24–0 |
| | | S27–3 | Q | 24–4 |
| S28 | J | S28–2 | F | 24–11 |
| | | S28–3 | H | 24–1 |
| S29 | 8 | S29–3 | L | 24–8 |
| S30 | M | S30–2 | F | 24–11 |
| | | S30–3 | Q | 24–4 |
| S31 | I | S31–2 | E | 24–12 |
| | | S31–3 | K | 24–9 |
| S32 | K | S32–2 | F | 24–11 |
| | | S32–3 | S | 24–2 |
| S33 | 9 | S33–3 | K | 24–9 |
| S34 | , | S34–2 | G | 24–S |
| | | S34–3 | G | 24–S |
| S35 | O | S35–2 | F | 24–11 |
| | | S35–3 | N | 24–6 |
| S36 | L | S36–2 | F | 24–11 |
| | | S36–3 | R | 24–3 |
| S37 | 0 | S37–3 | J | 24–0 |
| S38 | P | S38–2 | F | 24–11 |
| | | S38–3 | M | 24–7 |
| S39 | : | S39–2 | G | 24–S |
| | | S39–3 | G | 24–S |
| S40 | 1 | S40–2 | H, T | 24–1 |
| | | S40–3 | C | |

[1] S3–2 refers to the contact in the middle of switch element S3, which contact connects with conductor 132. Similarly for the other switch elements.

[2] S3–3 refers to the leftmost contact of switch element S3, the one associated with conductor 133.

FIG. 9 is intended to correspond generally with the foregong table, but no effort has been made to show all of the connections in FIG. 9 or to attain exhaustive consistency since the precise connections are more reliably illustrated in the table.

The output conductors such as indicated at 301 in FIG. 9 which are part of the cable 12 in an actual embodiment lead from terminals 192 to terminals of plug P1 (designated by letters D, G, E, F, H, J, K, L, M, N, P, Q, R, S, C, T, B, U, A and V). The conductors such as 302 in FIG. 9 represent a quickly detachable coupling between parts **102*b* and 102*c*. The conductors 302 may actually be formed on a printed circuit board 303, FIG. 4 which projects from part 102*b* and is frictionally held in a receptacle of part 102*c*. Further, there may be two rows of terminals such as the (lower) row of terminals 192 seen in FIG. 4, and corresponding series of individual conductors such as indicated at 302*a* in FIG. 4, on the upper and lower surfaces of the printed circuit board 303. The cable 12 connecting with terminals 192 in FIGS. 4 and 6 has not been shown in these views. It will be understood that physically conductors 301 bypass part 102*c* and lead directly to terminals 192 of part 102*b*. For example a red conductor of cable 12 which leads to terminal A of plug P1 may be be soldered to a terminal 192 (having a location designated 1B) of part 102*b*. (The location 1B of part 102*b* is actually connected electrically to location 86 of part 102*c* by means of a conductive strip such as 302*a*, FIG. 4, on circuit board 303.) By way of example, part 102*b* may be an 86 contact printed circuit board connector available commercially as Elco part No. 6023 or the equivalent, and part 102*c*** may be an 86 contact connector available commercially as Cinch-Jones part No. 254–43–70–114 1395–34 or the equivalent.

A significant feature of the invention resides in the arrangement of the contacts of the switch elements 106 whereby a positive physical contact must be established between lines such as 132 and 133 before these contacts can complete the circuit to the conductor 104. This arrangement insures that where a two element code is being transmitted, both elements of the code will be transmitted, or neither of the elements will be transmitted and the card punch will fail to operate. Without the illustrated feature, one pulse of a two pulse code might be transmitted causing the card punch to operate, and the operator could not be warned of a malfunction.

Referring to FIGS. 5 and 7, for example, where the typewriter or other machine provides a relatively small actuating movement of the order of ⅜ inch in the direction of arrow 120, the adjustment of the switch actuating blades 108 is relatively critical, and it is preferred to provide an additional return coil spring for each actuating blade 108 in order to insure a reliable return of the blades to a desired initial or deactuated position. Preferably an uncoiled part of each of the added springs at one end is connected to the screw 112, FIG. 5, with the uncoiled length at the one end extending in close relation to the underside of a free end portion of the blade. The opposite end of each return spring is attached to the mounting bar **102*a* so as to place the return spring under tension so as to normally hold said free end portion of the blade in a clear position with the spring 110 limiting the downward movement of the free end portion of the blade. When a lever 91 is actuated, the additional tension on the spring 110 associated therewith serves to snap said free end portion of the associated blade 108** to an actuating position with the uncoiled end portion of the added return spring actually contacting the blade over the extent of said free end portion. The snap action of the free end portion of the blade in moving between its actuated and deactuated positions is similar to that found in conventional microswitches.

In other standard commercial electric typewriters the actuating movement available for operating the encoder of the present invention is about ½ inch and return coil springs are not used.

The encoder of the present invention has been successfully applied to a calculating machine as well as to electric typewriters of various standard commercial makes. The term "business machine" as used in the claims is intended to cover machines such as time clocks which are actuated by cards, for example, as well as manual key operated machines.

Referring to FIG. 9, it will be noted that no signal is transmitted by the switch units unless contact is made with the third or right hand contact of each set of switch contacts since this third contact is connected to the common conductor 104. Thus if only the first two switch contacts engage, no signal is transmitted. As a result a partial or incorrect code cannot be transmitted. This is termed a mechanical parity check.

Further, the fuse 47 is so designed as to be ruptured if three or more solenoids are simultaneously energized. This is termed herein an electrical parity check. Of course a mechanically operating circuit breaker may be substituted for the fuse 47, for convenience in restoring operation after a malfunction.

It will be apparent that many modifications and variations may be effected without departing from the scope of the novel concepts of the present invention.

I claim as my invention:

1. In a card punch having a series of actuating levers for actuating respective card punch elements, a plurality of solenoids having armatures movable in response to energization of the respective solenoids and coupled to the respective actuating levers, means for mounting said solenoids in fixed aligned relation to the respective actuating levers, and coil springs interposed between the armatures and the respective actuating levers for transmitting actuating forces from the armatures to the respective associated actuating levers.

2. The punch of claim 1 with the actuating levers having projections with sloping edges extending into and constraining the ends of the respective coil springs received thereby.

3. An encoder adapter for a business machine having a series of manually actuatable keys, comprising multiple switch means having a series of individually operable switches, said individually operable switches having respective individual means for coupling to respective manually actuatable keys of a business machine for actuation of the respective switches in response to manual actuation of the respective corresponding keys of the business machine, and coding means connected with said individually operable switches for transmitting respective digitally coded signals uniquely signifying actuation of the respective individually operable switches for transmitting successive coded signals in accordance with the successive actuation of the keys of the business machine to which said adapter is coupled, said individual means for coupling to respective manually actuatable keys of the machine comprising respective helical coil springs coupled to and controlling actuation of the respective individually operable switches.

4. The adapter of cliam 3 with screw means connecting the respective helical coil springs with the respective individually operable switches and each screw means threadedly engaging a helically coiled end portion of one of said springs.

5. An encoder adapter for a business machine having a series of manually actuatable keys, comprising multiple switch means having a series of individually operable switches, said individually operable switches having respective individual means for coupling to respective manually actuatable keys of a business machine for actuation of the respective switches in response to manual actuation of the respective corresponding keys of the business machine, and coding means connected with said individually operable switches for transmitting respective digitally coded signals uniquely signifying actuation of the respective individually operable switches for transmitting successive coded signals in accordance with the successive actuation of the keys of the business machine to which said adapter is coupled, and universal bracket means having a first part for attachment to the business machine and having a second part with plural degrees of adjustment relative to said first part and mounting said multiple switch means as a unit.

6. The adapter of claim 5 with said bracket means also carrying said coding means as a unitary assembly with said multiple switch means.

7. In a data processing system, a card punch having respective card punch elements and having an array of operating levers constructed for responding to a downward manual force thereon to deflect downwardly and transmit an actuating force to the respective card punch elements for moving the punch elements through a card punching stroke, and an array of electrically operable solenoids mounted above said array of operating levers and having respective armatures directly coupled to the respective operating levers and movable downwardly in response to energization of the respective solenoids with sufficient force to actuate the respective operating levers, a switch unit, means for mounting said switch unit on a business machine, multiple switches in said unit selectively tripped by the business machine on which the unit is mounted, and circuits connected with said electrically operable solenoids and controlled by said switches for selectively energizing said solenoids and thereby supplying the power for operating the associated punch elements in response to the operation of said switch unit, the switch unit having error monitoring means monitoring current flow to said solenoids and responsive to simultaneous energization of more than a predetermined number of said solenoids to signal a coding error.

8. In a data processing system, a card punch having respective card punch elements and having an array of operating levers constructed for responding to a downward manual force thereon to deflect downwardly and transmit an actuating force to the respective card punch elements for moving the punch elements through a card punching stroke, and an array of electrically operable solenoids mounted above said array of operating levers and having respective armatures directly coupled to the respective operating levers and movable downwardly in response to energization of the respective solenoids with sufficient force to actuate the respective operating levers, a switch unit, means for mounting said switch unit on a business machine, multiple switches in said unit selectively tripped by the business machine on which the unit is mounted, and circuits connected with said electrically operable solenoids and controlled by said switches for selectively energizing said solenoids and thereby supplying the power for operating the associated punch elements in response to the operation of said switch unit, each of the multiple switches having a plurality of sets of contacts which are sequentially mechanically actuated including a last operated set of contacts, and means preventing operation of the card punch in the absence of closure of such last operated set of contacts.

References Cited

UNITED STATES PATENTS

| | | | |
|---|---|---|---|
| 1,880,408 | 10/1932 | Bryce | 234—96 |
| 2,377,801 | 6/1945 | Mills | 197—1.6 |
| 2,569,805 | 10/1951 | Doty | 234—36 X |
| 3,014,644 | 12/1961 | Clay | 234—123 X |
| 3,112,821 | 12/1963 | Hess | 197—1.5 |
| 3,132,554 | 5/1964 | Boudreau | 234—119 X |
| 1,271,614 | 7/1918 | Powers | 234—36 X |
| 1,298,400 | 3/1919 | Reynolds | 234—123 X |

WILLIAM S. LAWSON, Primary Examiner

U.S. Cl. X.R.

197—1.6; 234—36, 96, 108, 123